United States Patent Office  2,850,486
Patented Sept. 2, 1958

2,850,486

POLYMERIZATION PRODUCTS OF THE DIALKYL ARYL AMIDES OF CYANO-ACRYLIC ACIDS

Gaetano F. D'Alelio, Pittsburgh, Pa., assignor to Koppers Company, Inc., a corporation of Delaware No Drawing. Continuation of application Serial No. 244,707, August 31, 1951. This application June 26, 1953, Serial No. 364,513

13 Claims. (Cl. 260—80.5)

This invention relates to new monomers and to new polymeric materials derived therefrom and is particularly directed to the polymerization products obtained by polymerizing a mass comprising as a new monomer a dialkylamino aryl amide of a beta-cyano acrylic or beta-cyano-methacrylic acid in the presence or absence of other ethylenic copolymerizable compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibilty can be obtained by the use of itaconic acid in small amounts as a copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that improvements in dyeing properties of acrylonitrile polymers are obtained by the polymerization of polymerizable masses comprising acrylonitrile and a dialkylamino aryl amide of beta-cyano-acrylic acid or beta-cyano-methacrylic acid with or without other copolymerizable ethylenic compounds. It has been found further that in addition to the fact that the dialkylamino aryl amides of beta-cyano-acrylic acid and beta-cyano-methacrylic acid yield particularly valuable copolymers with acrylonitrile, they can also be used effectively to form copolymers with other types of copolymerizable ethylenic compounds having a $CH_2=C<$ group. Thus it has been found that valuable polymerization products can be prepared in accordance with the invention by polymerizing a mass comprising a dialkylamino aryl amide of a beta-cyano-acrylic or beta-cyano-methacrylic acid in the presence of one or more other ethylenic polymerizable compounds such as acrylonitrile and other polymerizable ethylenic compounds listed hereinafter.

The amides used in the practice of the invention are formed by reacting an amide-forming dialkylamino aryl amine, i. e., a dialkylamino aryl amine having a replaceable N-hydrogen, beta-cyano-acrylic acid, beta-cyano-alpha-methacrylic acid and the acyl chlorides and anhydrides thereof.

For example, N-(para-dimethylamino phenyl) beta-cyano-acrylic amide (para-dimethylamino beta-cyano-acrylanilide) of the structure

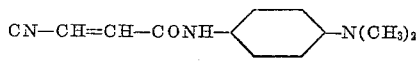

can be prepared readily by reacting beta-cyano-acrylic chloride with para-amino-dimethyl aniline. The corresponding beta-cyano-methacrylanilide is prepared by using beta-cyano-methacrylic anhydride or beta-cyano-methacrylic chloride instead of beta-cyano-acrylic anhydride or beta-cyano-acrylic chloride.

The dialkylamino aryl amides of beta-cyano-acrylic acid used in the practice of the invention can be represented by the general formula

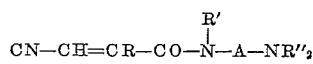

in which R is hydrogen or the methyl group; R' is selected from the class consisting of hydrogen and an alkyl group; the radical NR''$_2$ is a dialkylamino group; and A is an aryl nucleus such as benzene or naphthalene. The alkyl groups may be methyl, ethyl, isopropyl, n-butyl, sec-butyl, amyl, hexyl, decyl and the like. Preferably the alkyl groups do not contain more than three carbon atoms and the aryl nucleus is unsubstituted except for hydrocarbon substituents containing a total of not more than four carbon atoms. Typical compounds are p-dimethyl-amino beta-cyanoacrylanilide, p-dimethyl-amino beta-cyano-methacrylanilide, the corresponding p-diethyl-amino, p-diisopropylamino, etc., compounds and the corresponding toluidides and xylidides such as those obtained from beta-cyano-acrylic or beta-cyano-methacrylic acid or anhydrides and 5-dimethylamino-2-methyl anilines, 3-dimethyl-amino-4-methyl aniline, 4-dimethylamino-3-methyl aniline, 4-dimethylamino-2-methyl aniline, 2-dimethylamino-5-methyl aniline, 3-diethylamino-4-methyl aniline, 4-diethylamino-3-methyl aniline, and 3-dimethyl-amino - 4,6 - dimethyl aniline; and 4 - dimethylamino - 1-naphthyl acrylamide and 1-naphthal methacrylamide.

The proportions of the amide in the polymerization products of the invention can vary over a wide range, ranging from equimolar proportions of amide down to very small amounts of amide such as may be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 per cent and the susceptibility increases as the amount is increased. Ordinarily sufficient improvement in dye susceptibility is obtained with amounts of amide ranging up to about 10 or 15 percent but it may be advantageous for reasons such as in the preparation of ion-exchange polymers or additives to improve dyeing properties to have a larger proportion of amide in the acrylonitrile copolymer. In such cases the concentration of amide may range up to or approaching 50 mol per cent. Within these proportions acrylonitrile copolymers of the invention show great affinity toward many dyes especially acidic and vat dyes.

In addition to the improvements effected in the resulting copolymers, the use of dialkylamino aryl amides of beta-cyano-acrylic acid has certain other advantages over the use of the corresponding acids. For example, the amides are more soluble in acrylonitrile than the acids, and therefore it is easier to get complete copolymerization of the amide with acrylonitrile in solution emulsion and suspension polymerizations.

The acrylonitrile copolymers discussed herein are soluble in N,N-dimethyl acetamide (DMA), N,N-dimethyl formamide (DMF), butyrolactone, ethyl carbonate, N,N-dimethyl methyl urethane of the formula

ethylene carbamate, N-methyl-2-pyrrolidone, and a number of similar solvents, used alone or in conjunction with N,N-dimethyl cyanamide, N,N-dimethyl-cyano-acetamide, N,N-dimethyl methoxy-acetamide, methylene dinitrile, methylene di-thiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

Example I 23.1 grams (0.2 mol) beta-cyano-acryl chloride is added slowly and with stirring to a mixture of 27.2 grams (0.2 mol) p-amino-dimethyl aniline and 150 ml. diethyl ether in a flask equipped for reflux. Upon completion of addition of the acid chloride the mixture is refluxed for approximately ½ hour. The ether is then evaporated and the residue dissolved in water and shaken with 29.0 grams (0.125 mol) silver oxide to remove the chloride ion. The mixture is filtered and the filtrate evaporated to dryness. The residue is recrystallized from absolute ethanol. There is obtained N-(p-dimethylamino-phenyl) beta-cyano-acryl amide.

Ultimate analyses for carbon, hydrogen and nitrogen and molecular weight determinations on the product give results which are in close agreement with the theoretical values for N-(p-dimethylamino-phenyl) beta-cyano-acryl amide.

Substitution of equivalent quantities of beta-cyano-methacrylic chloride or of various dialkylamino aryl amines as described above respectively in the foregoing procedure yields the various dialkylamino aryl amides of cyano-acrylic and methacrylic acids of this invention which are characterized by ultimate analyses and molecular weight determinations as described in the foregoing procedure.

Example II

Five polymers of acrylonitrile are prepared from the following monomer compositions:

| Polymer | Acrylonitrile, parts | N-(p-dimethylamino-phenyl)-beta-cyano-acryl amide, parts |
|---|---|---|
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 1.0 part of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide or butyrolactone and a film cast from the solution. The film is washed entirely free of solvent and stretched at a ratio of about 8:1 in a glycerine bath at 135 to 145° C. The film is then washed with water and dyed in a bath containing for each part of film 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile retains little or no color, all of the copolymers are dyed to a deeper blue shade.

Fibers are spun from the same polymer solutions either by dry spinning or by wet spinning. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, ethylene carbonate, formyl morpholine, etc.

Instead of N-(p-dimethylamino phenyl) beta-cyano-acryl amide there can be used any of the amides listed above.

Example III

Five parts of the copolymer fiber C of Example II is dyed to a green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating 0.25 part of Glauber's salt is added. The sample is then oxidized in an aqueous 0.5 percent sodium dichromate 1.0 percent acetic acid solution at 70° C. for 30 minutes in a 20:1 bath-fiber ratio. The dyed fiber is then scoured in a 0.5 percent boiling soap solution. A sample of yarn prepared from the unmodified acrylonitrile polymers and dyed under the same conditions acquires a light shade of color.

When 1,5-di-p-anisoylamino-4,8-dihydroxy-anthraquinone is used as the vat dye, the fiber is dyed a strong violet color.

Example IV

The procedure of Example II is repeated for the polymerization of the following monomer compositions:

| Polymer | Acrylonitrile, parts | Vinyl chloride, parts | N-(p-diethylamino phenyl)-beta-cyano-methacryl amide, parts | Copolymer soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO₂Me. |
| E | 57 | 40 | 3 | NO₂Me. |
| F | 37 | 60 | 3 | Acetone. |

Sometimes copolymers D and E, when dissolved in nitromethane may have gelled, partially dissolved particles known as fisheyes. In such cases, the solubility can be improved by the addition of small amounts of materials which are good solvents for acrylonitrile polymers, such as a butyrolactone, ethylene carbonate, dimethyl formamide, dimethyl acetamide, tetramethyl urea, etc. In addition certain materials which are relatively poor solvents for polyacrylonitrile, such as diethyl formamide, diethyl acetamide, diethyl propionamide, etc., can be added to improve the solubility. Also when acetone solutions of copolymer F contain gelled particles, clarification of the solution can be effected by the addition of nitromethane, diethyl formamide, diethyl acetamide, etc.

Dyeing tests of these copolymers show improvements in dyeing susceptibility similar to those of Example II.

Instead of N-(p-dimethylamino phenyl)beta-cyanoacryl amide there can be used any of the amides listed above.

Example V

The procedure of Example II is repeated for the polymerization of the following monomer compositions:

| Polymer | Acrylonitrile, parts | Styrene, parts | N-(p-dimethylamino phenyl) beta-cyanoacryl amide, parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example II. In place of styrene, various styrene derivatives can be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5-dichloro-styrenes, trichlorostyrenes; cyano-styrenes, such as ortho-, meta-, and para-cyano-styrenes, dicyano-styrenes; nuclear-substituted alkyl-styrenes, such as mono- and di-methyl-styrenes, mono- and di-ethyl-styrenes, mono- and di-isopropyl-styrenes; aryl-substituted styrenes, i. e., para-phenyl-styrene, etc.; cycloaliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta-, and para-trifluoromethyl-styrenes, di-(trifluoromethyl)-styrenes, and various other styrenes or mixtures of any number of these with each other or with styrene.

Instead of N-(p-dimethylamino phenyl) beta-cyanoacryl amide there can be used any of the amides listed above.

Example VI

The procedure of Example II is repeated for the polymerization of the following monomer compositions:

| Polymer | Acrylonitrile, parts | Vinylidene chloride, parts | N-(p-dimethylamino phenyl) beta-cyanoacryl amide, parts | Copolymer soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 percent in the polymer molecules, only the more active solvents, such as butyrolactone, N,N-dimethyl acetamide, N,N-dimethyl formamide, N,N,N',N'-tetramethyl urea, etc., can be used as solvents. The above copolymers dye more readily and thoroughly than similar copolymers containing no acrylic amide having a dimethylamino aryl nucleus.

Example VII

The procedure of Example II is repeated for the polymerization of the following monomer compositions:

| Polymer | Acrylonitrile, parts | Vinylidene chloride, parts | Vinyl chloride, parts | N-(p-dimethylamino phenyl) beta-cyanoacryl amide, parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example II.

Instead of N-(p-dimethylamino phenyl) beta-cyanoacryl amide there can be used any of the amides listed above.

It is possible also to use copolymers of the amides of this invention having relatively higher proportions of the dialkylamino aryl amides to modify polyacrylonitrile or acrylonitrile copolymers. Thus the dyeability of acrylonitrile polymers may be improved by blending with them copolymers of acrylonitrile and the amides of this invention. The overall amounts of such amides required to improve the dyeability generally corresponds to the amounts indicated above for copolymers in which the acrylonitrile polymers contain the amides copolymerized directly in the main body of the acrylonitrile polymers, that is, from at least 0.1 percent to advantageously 5 percent or even 15 percent in the ultimate polymer mixture.

Example VIII

A 10 percent solution of polymer E of Example II, which consists of 80 parts acrylonitrile and 20 parts p-dimethylamino beta-cyano-acrylanilide, is prepared in dimethyl formamide and added to a dimethyl formamide solution of polyacrylonitrile, containing 20 percent polymer so that a composition consisting of 90 parts of polyacrylonitrile and 10 parts of the N-(p-di-methylamino phenyl) beta-cyano-acrylamide copolymer is obtained as to give an ultimate polymer composition of 98 parts acrylonitrile and 2 parts amide. The solution is heated to 130° C., after which the solution is filtered. Films and fibers prepared from this mixture are dyed in accordance with the process of Example II, and satisfactory dyed, shaped articles are obtained. The unmodified polyacrylonitrile without the addition of the N-(p-dimethylamino phenyl) beta-cyano-acryl amide copolymer shows little or no dye retention.

In many cases, it is desirable to use amide-acrylonitrile copolymers which have even a higher ratio of the amide, that is as high as 50 mol percent of the amide, as for example, 50 to 70 parts by weight of the amide copolymerized with acrylonitrile or methacrylonitrile, and even these copolymers of higher amide proportions have good compatibility with acrylonitrile polymers. In other cases, the copolymers of acryl amides with other monomers are satisfactory such as, for example, copolymers of styrene, vinyl chloride, vinylidene chloride, alpha-methyl-styrene, etc.

When it is desired to modify an acryonitrile copolymer such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus as there are in the acrylonitrile copolymer, structural units derived from the acrylonitrile and styrene, it is desirable to have present in the modifying copolymer structural units derived from styrene in addition to those derived from acrylonitrile and the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the present invention have in the polymer molecule a plurality of repeating units of the formula

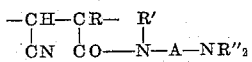

in which A, R, R', and R'' are substituents of the types indicated above, and will contain additional repeating units of the formula

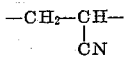

when the amide is copolymerized with acrylonitrile.

In addition, the polymerization products can contain any number of repeating units of the type obtained by the copolymerization of a dialkylamino aryl amide of beta-cyano-acrylic or beta-cyano-methacrylic acid, or a mixture of this amide and acrylonitrile, with one or more copolymerizable ethylenic compounds, such as, for example vinylidene chloride, vinyl chloride, styrene, alpha-methyl-styrene and methacrylonitrile. When the polymerization mass contains, in addition to amide, a polymerizable monomer having a $CH_2=C<$ group in an amount such that the latter monomer is present to an extent of at least 50 mol percent of the overall monomer content, then such monomers as fumaronitrile, beta-cyano-acryl amide and methyl beta-cyano-acrylate can also be present in the polymerization mixture.

As previously indicated, the solvent resistance of such copolymers as contain one or more monomer units in addition to those formed by the acrylonitrile and the dialkylamino aryl amide of beta-cyano-acrylic or beta-cyano-methacrylic acid is affected by the type and proportion of copolymerizing monomer or monomers used to replace part of the acrylonitrile. For example, copolymers containing small amounts of the units of a dialkylamino aryl amide of a beta-cyano-acrylic or beta-cyano-methacrylic acid may contain various proportions of one or more of such monomer units as obtained from vinylidene chloride, methacrylonitrile, fumaronitrile and beta-cyano-acryl amide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example the tensile strength of an acrylonitrile-amide type copolymer according to the invention will decrease much more when a monomer having relatively weak secondary bonding forces, such as styrene or ethylene is used to replace part of the acrylonitrile than when one or more monomers having relatively strong bonding forces, such as methacrylonitrile, fumaronitrile, beta - cyano - acryl amide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization with the dialkylamino aryl amides of beta-cyano-acrylic or beta-cyano-methacrylic acid and/or acrylonitrile include one or more of the following: acrylates, e. g. methyl acrylate; methacrylates, e. g. methyl methacrylate; acrylamides; methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and the nuclear-substituted styrenes listed in Example V, etc.

The polymerization products of this invention can be prepared by various polymerization systems, such as emulsion, suspension, mass and solution polymerizations. In addition to the monomers, the polymerizable mass can also contain other materials such as catalysts, e. g. peroxides, such as benzoyl peroxide, naphthyl peroxides, phthalyl peroxide, tertiarybutyl hydroperoxide, hydrogen peroxide, cyclohexyl hydroperoxide, tertiarybutyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 can be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., can be used as a precipitating bath for N,N-dimethyl acetamide, N,N,N',N'-tetramethyl urea, butyrolactone, ethylene carbonate and other solvent compositions of these copolymers. The extruded fibers, from which substantially all of the solvent has been removed in the spinning step, about 1–10 percent remaining in the shaped article, can then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent dialkylamino aryl amide of a beta-cyano-acrylic or beta-cyano-methacrylic acid in the polymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the dialkylamino aryl amide of a beta-cyano-acrylic or beta-cyano-methacrylic acid, the proportion of acrylonitrile in the copolymers can be much less than 85 percent without destroying the capacity for molecular orientation. Molecularly oriented, cold-drawn, shaped articles of particular usefulness are prepared from copolymer compositions containing in the polymer molecules 60–99.9 percent acrylonitrile, 0.1–15 percent, advantageously 0.1–5 percent, dialkylamino aryl amide of a beta-cyano-acrylic or beta-cyano-methacrylic acid, with or without one or more monomers of the class consisting of vinylidene chloride, vinyl chloride, styrene, alpha-methyl-styrene, methacrylonitrile, fumaronitrile, beta-cyano-acryl amide and methyl beta-cyano-acrylate, the effects of the presence of the monomers of this class being noticeable when the monomer is present in the polymer molecule in amounts of 1 percent or more.

The polymerization products of this invention show great affinity for the acetate, acidic and vat dyes. The cellulose acetate dyes which are effective with these polymerization products are mainly amino-anthraquinone derivatives. A number of other acidic dyes that can be used are anthranilic acid→1-(4'-sulfo-phenyl), 3-methyl-5-pyrazolone; 1,5-diamino-4,8-dihydroxyanthraquinone-3-sulfonic acid; 1-aminonaphthalene-4-sulfonic acid→alpha-naphthol-4-sulfonic acid; the sodium salt of sulfanilic acid→aniline→2 - benzoyl - amino - 5-naphthol-7-sulfonic acid; the sodium salt of 4,4'-diaminostilbene-2,2'-di-sulfonic acid⇌(phenol)₂ ethylated; 1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-amino-benzoic acid→o-anisidine) phosgenated; the sodium salt of (2-naphthol-6,8-disulfonic acid←benzidine→phenol) ethylated; dimethoxy-dibenzanthrone; and 1,5-di-p-anisoylamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation of my presently copending application Serial No. 244,707 filed August 31, 1951 now abandoned.

What is claimed is:

1. As a new monomeric composition of matter, a compound having the formula

in which R is selected from the class consisting of hydrogen and the methyl radical; R' is selected from the class consisting of hydrogen and an alkyl group; the radical —NR"₂ is a dialkylamino group in which the alkyl groups contain not more than 3 carbon atoms each; and A is a benzenoid hydrocarbon group containing not more than 15 carbon atoms.

2. As a new monomeric composition of matter a compound having the formula $$CN-CH=CH-CONH-C_6H_5-N(CH_3)_2$$

3. As a new composition of matter, a dialkylamino beta-cyanoacrylanilide in which the alkyl groups contain not more than three carbon atoms each.

4. As a new composition of matter, a dialkylamino beta-cyanomethacrylanilide in which the alkyl groups contain not more than three carbon atoms each.

5. As a new composition of matter, p-dimethylamino beta-cyanoacrylanilide.

6. As a new composition of matter, p-dimethylamino beta-cyanomethacrylanilide.

7. A polymerization product comprising a copolymer of acrylonitrile and a dialkylamino aryl amide of an acid selected from the class consisting of beta-cyano acrylic and beta-cyano methacrylic acid, said amide being represented by the general formula

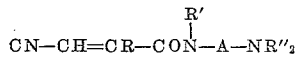

in which R is selected from the class consisting of hydrogen and the methyl radical; R' is selected from the class consisting of hydrogen and an alkyl group; the radical NR"₂ is a dialkylamino group in which the alkyl groups contain not more than three carbon atoms each; and A is a benzenoid hydrocarbon group containing not more than 15 carbon atoms.

8. The polymerization product of claim 7 in which the amide comprises up to 50 mole percent of the product.

9. The polymerization product of claim 7 in which the amide comprises up to 20 percent by weight of the product.

10. A cold-drawn fiber having molecular orientation and dye susceptibility to acid dyes, said fiber comprising a copolymer of about 60–98.9 percent by weight acrylonitrile, about 0.1 to 5 percent by weight a dialkylamino beta-cyano-acrylanilide in which the alkyl groups contain not more than three carbon atoms each, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl beta-cyano-acrylate.

11. A cold-drawn fiber having molecular orientation and dye susceptibility to acid dyes, said fiber comprising a copolymer of about 60–98.9 percent by weight acrylonitrile, about 0.1 to 5 percent by weight a dialkylamino beta-cyano-acrylanilide in which the alkyl groups contain not more than three carbon atoms each, and about 1 to 39.9 percent by weight vinylidene chloride.

12. A cold-drawn fiber having molecular orientation and dye susceptibility to acid dyes, said fiber comprising a copolymer of about 60–98.9 percent by weight acrylonitrile, about 0.1 to 5 percent by weight a dialkylamino beta-cyano-acrylanilide in which the alkyl groups contain not more than three carbon atoms each, and about 1 to 39.9 percent by weight vinyl chloride.

13. A cold-drawn fiber having molecular orientation and dye susceptibility to acid dyes, said fiber comprising a copolymer of about 60–98.9 percent by weight acrylonitrile, about 0.1 to 5 percent by weight a dialkylamino beta-cyano-acrylanilide in which the alkyl groups contain not more than three carbon atoms each, and about 1 to 39.9 percent by weight styrene.

References Cited in the file of this patent

UNITED STATES PATENTS 2,531,408    D'Alelio _____ Nov. 28, 1950

FOREIGN PATENTS 648,886    Great Britain _____ Jan. 17, 1951